3,366,475
HIGH TEMPERATURE RESISTANT TITANIUM BASED ALLOY
William T. Kaarlela, Fort Worth, Tex., assignor to General Dynamics Corporation, Fort Worth, Tex., a corporation of Delaware
No Drawing. Filed Oct. 1, 1965, Ser. No. 492,272
4 Claims. (Cl. 75—134)

ABSTRACT OF THE DISCLOSURE

An alloy, particularly suitable for brazed honeycomb structures to reduce aerodynamic heat conduction from an exposed outer skin to the inner skin, having a low thermal conductivity, the alloy consisting of, by weight, titanium 30 to 60%, chromium 30 to 60% and indium 3 to 20%.

---

The present invention relates generally to alloys employed to join metals which maintain structural integrity at high temperatures, such as refractory metals.

More particularly, the present invention relates to an alloy which is capable of effecting a structural joint between two refractory metals at a temperature less than the recrystallization temperature of such metals, and which will not remelt or lose its structural integrity until the integrity of the parent material has been surpassed; and is also characterized by its extremely low coefficient of thermal conductivity.

It has become increasingly important, particularly in aircraft and space applications, to use high strength materials which are capable of withstanding extremely high temperatures, primarily because of the temperatures generated by aerodynamic heating. One such material capable of maintaining its structural qualities at elevated temperatures is columbium. This metal is one of the high strength refractory metals with a melting point of approximately 4400° F. From a design standpoint, it is an excellent material because of its high strength-to-weight ratio in the 2000° F. to 2500° F. range, and its high melting point, characteristics which engender good strength retention above the useful temperature range of currently available structural alloys.

Useful as refractory metals are in high temperature applications, fabrication of aircraft or missile components is extremely difficult to accomplish. This is due primarily to difficulty encountered in joining plural sections of such material into one structural composite. Presently known and utilized methods of joining refractory metals require the application of very high temperatures to permit the base material, or the braze alloy to properly melt, flow and subsequently fillet between the parts to be joined. These high temperatures are appreciably above the recrystallization temperature of refractory metals, materially detrimentally effecting the structural integrity of the material.

Recrystallization which results in an approximately 50% loss of strength of base material, is a function of time and temperature, and occurs in columbium between 2200° F. and 2800° F. depending upon alloy make-up. Further, temperatures of this order cause a serious loss in ductility of the metals, and depress the embrittlement transition temperature. In welding and other presently employed brazing processes, nitrogen and atmospheric contamination occurs, which further weakens the resultant joint.

Even though the braze alloy of the present invention effects a structural joinder of two refractory members at a temperature of about 2460° F., it is only necessary to remain at this temperature for approximately one minute. This time duration is not sufficient to cause significant recrystallization in such alloys, even though their recrystallization temperature is in the 2400° F. range. Alloys having a recrystallization temperature of from about 2400° F. to about 2800° F. can be joined with no fear of recrystallization due to brazing when the braze alloy of the present invention is employed.

While columbium can be joined initially at 2460° F., the braze alloy will not remelt until a temperature in excess of 3500° F., or almost the melting temperature of the columbium base material, has been reached. This characteristic is hereafter referred to as the remelt phenomena. This phenomena permits the refractory metal to be joined at a temperature well below that which results in a loss of the superior structural characteristics for which the material was originally chosen, and will not remelt until the maximum allowable temperature of the base material is approached. This alloy thus permits the creation of a joint which is compatible with the strength characteristics of the joined materials.

In addition braze alloys of the prior art form braze alloys fillets at the nodes of brazed honeycomb sandwich structure and function as heat paths which rapidly conduct aerodynamic heat from the exposed outer skin of a sandwich structure heat shield to the inner protected skin.

Heat shields constructed using the alloy of the present invention significantly retard thermal conductivity between skins due to its intrinsic low thermal conductivity thereby effecting a much improved thermal gradient between skins and enabling heat shields to perform at higher degrees of efficiency.

Accordingly, it is the object of the present invention to provide a brazing alloy possessing the ability to join two refractory metal alloy members at a temperature below a point which would be detrimental to their unique structural properties, while possessing a novel remelt phenomena which permits the brazed joint to maintain its structural integrity up to a temperature compatible with the high temperature strength of the refractory members.

Another object of the present invention is to provide an alloy which possesses an extremely low coefficient of thermal conductivity. These and other objects and advantages of the present invention will become apparent from the following description of the alloys and their characteristics.

In general, the herein described alloys include as a matrix, a substantially balanced ratio of titanium and chromium in a solid solution with indium added as a melting point depressant. More specifically, titanium has been found to be a highly satisfactory alloying element, being highly compatible with columbium and promoting formation of a narrow diffusion layer at the interface with the columbium. Its general range as used in the alloys of this invention is from about 60% to about 30% by weight of the alloy composition.

Chromium, like titanium, is compatible with columbium and also forms a diffusion layer which is much like that formed by titanium, but shows more interaction at the interface with the brazing alloy. As used herein the general range for chromium is from about 60% to about 30% by weight of the alloy.

Indium is employed as a melting point depressant. It is lightweight, inexpensive and also has very low thermal conductivity, giving the alloy utility in such uses as heat shield applications as previously noted. This is possible due to the dispersion of the indium in the matrix materials which lowers the thermal conductivity of the entire braze alloy.

Although the process for alloy formulation is subject to variation, the alloys of this invention have for test purposes been formulated by mixing the elemental constituents together in the desired proportions in powder form. The mixture is subsequently briquetted into a compact, and melted in a cold hearth copper crucible. If ductile, the alloy may then be rolled to form a foil, or in the alternative, broken into a powder to be used in such form.

As formulated herein, the alloys of this invention have taken the powder form. Application is effected by mixing the powder alloy with polyvinyl alcohol or a suitable acrylic resin in a slurry, which is then painted on the area to be jointed. The alloy is then heated in an argon or vacuum atmosphere to a temperature just below the recrystallization temperature of the base metal, or approximately 2000° F., and allowed to remain at that temperature until it stabilizes. It is then rapidly raised to the melting point of the braze alloy for a short period and allowed to properly flow and fillet. It is then subsequently dropped to ambient temperature.

A moderate effort should be made to purify the argon gas when used. This is accomplished by passing the argon through a glass-activated alumina dryer, a −100° F. dry ice acetone cold trap, and a closed zirconia tube filled with titanium strips and operating at 1750° F. The protection offered by the argon gas is relatively important. Should atmospheric contamination occur it will be reflected in reduced flow and wetting of the brazing alloy.

For purposes of the tests, the results of which are reflected in the data below, the brazed lap shear test specimens were made up using a columbium alloy for the members to be joined. Time at temperature prior to testing was one minute. Using a specially designed hydraulic lap-shear test setup, failure was made to occur within one minute by steadily increasing the mechanical stress upon the specimen. Stress was measured by means of a load link in conjunction with a strain recorder. Specimens were confined under a protective argon atmosphere during heating, testing, and cooling.

The alloy of this invention is set out in Table I below with an indication both as to the general range of its ingredients and as to the specific composition of the particular alloy tested. Also shown are the initial alloy melting or brazing temperature and the remelt temperature, and the joint shear strength at elevated temperature.

TABLE I

| Alloy—General Range or Specific Composition | Composition by Weight | | | General Range | | |
|---|---|---|---|---|---|---|
| | Ti | Cr. | Ind. | Brazing Temp., °F. | Joint Remelt Temp. in °F. | Joint Strength p.s.i. at 2,000° F. |
| General | 60–30 | 60–30 | 20–3 | 2,460 | +3,500 | 9,100 |
| Specific | 47.5 | 47.5 | 5 | | | |

Honeycomb sandwich panels were also brazed using the alloy of the invention. The honeycomb was made of 2 mil B-66 columbium alloy containing 5% V, 5% Mo, 1% Zr and having ¼" cells, ½" deep. Results are shown below in Table II.

TABLE II

| Temp. | Column Compression Strength, p.s.i. | Failure Mode |
|---|---|---|
| Room Temp | 95,000 | Intercellular dimpling. |
| 2,500° F | 15,000 | Do. |
| 2,800° F | 3,000 | Do. |

It is the above qualities of the alloy of this invention which adapt it for use in metal fabrication applications. It was noted that superior corrosion and oxidation resistance also is offered at elevated temperatures.

Visual and microstructural studies of the high temperature oxidation characteristics of the above alloy indicates its usefulness as a protective coating for materials having a low resistance to oxidation at elevated temperatures. Application of the alloy for oxidation protection may be accomplished by painting or spraying the alloy in powdered form on the surface of the metal to be protected and then heating the coated assembly until the alloy melts and flows to form a continuous surface coating. The above alloy showed percent weight changes of less than 5% after 100 hours at 2000° F. air, indicating the superior quality of the alloy as a protective coating.

Upon consideration of the high temperature shear strength, corrosion resistance and oxidation resistance of the alloy hereinabove described, it is apparent that it may be employed as a structural material in its own right.

What is claimed is:

1. An alloy having high ductility and low thermal conductivity, a first melt point effective for brazing, and a remelt point considerably above said first point, said alloy consisting of from about 30% to about 60% by weight titanium, from about 30% to about 60% by weight chromium, and from about 3% to about 20% by weight indium.

2. An alloy characterized by its ability to withstand high temperatures, and having high ductility, low thermal conductivity, and a braze point of about 2400° F. and a remelt temperature substantially in excess thereof, said alloy consisting of from about 40% to about 50% by weight titanium, from about 40% to about 50% by weight chromium, and from about 10% to about 15% by weight indium.

3. An alloy having low thermal conductivity characterized by its ability to withstand high temperatures and having a first brazing point of about 2460° F. and a remelt point of about 3500° F., said alloy consisting of from about 45% to about 50% by weight titanium, from about 45% to about 50% by weight chromium, and from about 3% to about 5% by weight indium.

4. An alloy characterized by its ability to withstand high temperatures and which possesses exceptionally low thermal conductivity and having a remelt temperature substantially in excess of its first braze melt temperature, said alloy consisting of from about 47.5% by weight titanium, from about 47.5% by weight chromium and from about 5% by weight indium.

References Cited

UNITED STATES PATENTS

| 2,950,189 | 8/1960 | Ames | 75—175.5 X |
| 3,131,059 | 4/1964 | Kaarlela | 75—134 |
| 3,265,491 | 8/1966 | Kaarlela | 75—134 |

FOREIGN PATENTS

| 168,061 | 9/1956 | Australia. |

OTHER REFERENCES

"Steel," Nov. 9, 1942, relied on pp. 80 and 81.
Scientific American, April 1944, "Versatile Indium," relied on pp. 154–156.

CHARLES N. LOVELL, *Primary Examiner.*